REAERATION OF HYDROCARBONS AND PETROLEUM FRACTIONS COMPARED TO WATER

EFFECT OF AIR FLOW ON OXYGEN TRANSFER RATE
IN WATER AND WATER-KEROSENE SYSTEMS
AT FIXED TURBINE REVOLUTIONS

EFFECT OF TURBINE REVOLUTIONS ON THE
OXYGEN TRANSFER RATE IN WATER AND
WATER-KEROSENE SYSTEMS AT A FIXED AIR FLOW

United States Patent Office 3,723,255
Patented Mar. 27, 1973

3,723,255
INCREASING OXYGEN TRANSFER INTO AQUEOUS SOLUTIONS
Cecil C. Walden and Terence E. Howard, Vancouver, British Columbia, Canada, assignors to Canadian Patents and Development Limited, Ottawa, Ontario, Canada
Filed May 29, 1969, Ser. No. 828,913
Int. Cl. C12b 1/14
U.S. Cl. 195—109
16 Claims

ABSTRACT OF THE DISCLOSURE

The rate and efficiency of oxygen transfer into aqueous solutions is increased according to the disclosed method by first selecting a water-immiscible liquid having the properties of either a greater solubility for oxygen than has water or, for an equivalent amount of energy, allows a faster transfer of oxygen into the liquid than is transferred into water under similar conditions or both. The liquid selected is then oxygenated, brought into contact with and dispersed throughout the aqueous solution to be oxygenated and the oxygen passes from the water-immiscible liquid into the aqueous solution. The water-immiscible liquid is then separated from the aqueous solution and optionally re-oxygenated and reused. The aqueous liquid may comprise a chemical system or a microbiological system. The method is useful in increasing the oxygen supply necessary to support aerobic microbiological fermentations as used in liquid waste treatment processes.

---

This invention relates to methods of transferring molecular oxygen from the gaseous state into aqueous media and solutions. An object of the present invention is the provision of improved techniques for transferring into solution the oxygen necessary to support aerobic microbiological fermentations of organic and inorganic materials. Another object of this invention is to improve transfer of gaseous molecular oxygen into chemical reaction systems where the dissolved molecular oxygen acts as the oxidizing agent, or electron acceptor.

The growth and respiration of all microorganisms requires oxygen. In aerobic fermentations, only that oxygen which is truly dissolved in the aqueous medium is available to the microorganisms; whereas in anaerobic fermentations the microorganism utilizes oxygen which is chemically bound into other molecules, such as nitrate and sulfate. For economic reasons, the source of oxygen for aerobic fermentations is usually the atmosphere, although bulk oxygen technically may be acceptable. The oxygen available to the bacteria is limited to the 6 to 10 mg./l. which are soluble in aqueous media over the normal range of fermentation temperatures. As the fermentation proceeds, this small reservoir of oxygen must be replenished continuously or the microorganisms undergo anoxia and perish. In liquid waste treatment stabilization ponds and basins and in many natural circumstances, the oxygen is supplied by diffusion through the surface of the water and by natural aeration. Under these conditions, the rate at which oxygen is transferred into solution is a limiting factor, requiring large exposed air-water surfaces and minimal depths of effluent being stabilized. Because both land costs and stabilization times may be excessive as a result of the slow rate of oxygen transfer, numerous techniques have been developed for increasing the rate of oxygen transfer from the gaseous to the dissolved state. These various techniques involve the direct introduction of oxygen from the atmosphere into the water, either by some form of sparging or mechanical device. The rate at which oxygen is transferred into the dissolved state may be expressed according to the following equation:

$$R = K_L \cdot A (C_0 - C)$$

where:

$R$ = the rate of oxygen transfer into the dissolved state,
$K_L$ = the mass transfer coefficient of oxygen across the liquid film boundary (which is the controlling transfer rate);
$A$ = area of the gaseous-liquid interface;
$C_0$ = saturation capacity of oxygen in the liquid medium at a given temperature, $T$; and
$C$ = the dissolved oxygen content of the liquid medium at any given time, $t$, for the same given temperature $T$.

Virtually all techniques now in use commercially for improving the rate of oxygen transfer into solutions involve increasing the term $A$ in the above equation, i.e., increasing the interfacial area. Fermentation techniques have been developed to permit utilization of this increase in oxygen transfer by increasing the bacterial flora. This is most readily accomplished, as in the activated sludge system for liquid waste effluent treatment, by separating the bacteria from the discharged effluent and recycling a portion of the sludge into the fermentation chamber. Thus, in these commercial systems, the operating costs involving energy input are related directly to the interfacial area created and the mixing necessary to maintain the bacterial sludge in suspension.

The rate of oxygen transfer into water is proportional to the interfacial area ($A$); and the oxygen deficit, i.e., the difference between the actual oxygen level and saturation ($C_0 - C$); the relationships being equated by a constant ($K_L$), principally a function of the resistance to transfer in the liquid film adjacent to the interface. Virtually all commercial installations for improving oxygen transfer involve mechanical devices for increasing the interfacial area. $K_L$ values are not identical for water, water solutions and water suspensions. However, limited attempts have been made to improve $K_L$ values by additives, since many materials which collect preferentially on the liquid side of the interface retard oxygen transfer but can be counteracted by additives.

Limited attempts have also been made to change the mass transfer coefficient for oxygen through the liquid film, i.e., $K_L$, by the use of additives in the liquid phase. This approach is of limited use, since surface-active additives block the interface and reduce oxygen transfer, whereas those additives without surface properties are limited in their effect by the necessry bulk concentration in the mass of the water phase. All of these commercial techniques are limited by the oxygen deficit ($C_0 - C$), which in most situations is about 6–8 mg./l.

The above notwithstanding, the efficiency of oxygen transfer from the gaseous to the dissolved state is poor. As little as 35% of atmospheric oxygen may be transferred to the dissolved state, during passage of air through a 10-ft. water column, even when dispersed by eminently acceptable existing commercial equipment.

The studies presented here represent a novel approach, attempting essentially to modify the oxygen deficit ($C_0 - C$) through the mediation of water-immiscible liquids with high oxygen solubility or fast oxygen transfer rates or both. The invention described here is particularly concerned with improving both the rate and efficiency of oxygen transfer by dissolving the oxygen in a water-immiscible liquid in which the oxygen solubility is appreciably greater than in water or which allows a faster transfer of oxygen into itself than water, or both, and then by contacting this oxygenated liquid with the water phase. The transfer of oxygen across the liquid-liquid interface is faster than across the gas-water interface.

The invention will be described with reference to the accompanying drawings in which.

Where the oxygen is dissolved in the immiscible phase, the driving force for oxygen transfer from the oxygenated immiscible liquid to water can be greater than from air to water since the oxygen deficit is not limited by the solubility in the water phase but rather by that in the immiscible liquid. In addition the oxygen, being dissolved in the immiscible oil, cannot escape from the system as does the entrained air. Depending upon the equlibrium conditions and the overall mass transfer coefficient for oxygen from the immiscible liquid to the water phase, the transfer of oxygen is increased both in rate and efficiency.

The solubility of oxygen in various solvents is shown in Table 1. It will be noted that there is considerable variation, and that the solubility in various hydrocarbons and petroleum fractions is appreciably greater than that in water.

TABLE 1.—SATURATION SOLUBILITY OF OXYGEN IN VARIOUS SOLVENTS

| Solvent | Temp., ° C. | Saturation solubility of oxygen in various solvents in contact with the atmosphere Mg./l. |
|---|---|---|
| Pyridine | 18.5 | 30 |
| Benzene | 19 | 49 |
| Toluene | 18 | 50 |
| Xylene | 16 | 51 |
| Petroleum ether | 18.5 | 123 |
| Benzine (65–100° C.) | 18 | 88 |
| Paraffin oil | 18 | 34 |
| Transformer oil | 25 | 47 |
| Petroleum (Russian) | 20 | 61 |
| Kerosene (commercial) | 18 | 48 |
| Water | 20 | 9.08 |

The immiscible-liquid solvents may be used alone with water or an aqueous solution or if desired two or more solvents may be combined to form the immiscible liquid.

Figure 1:
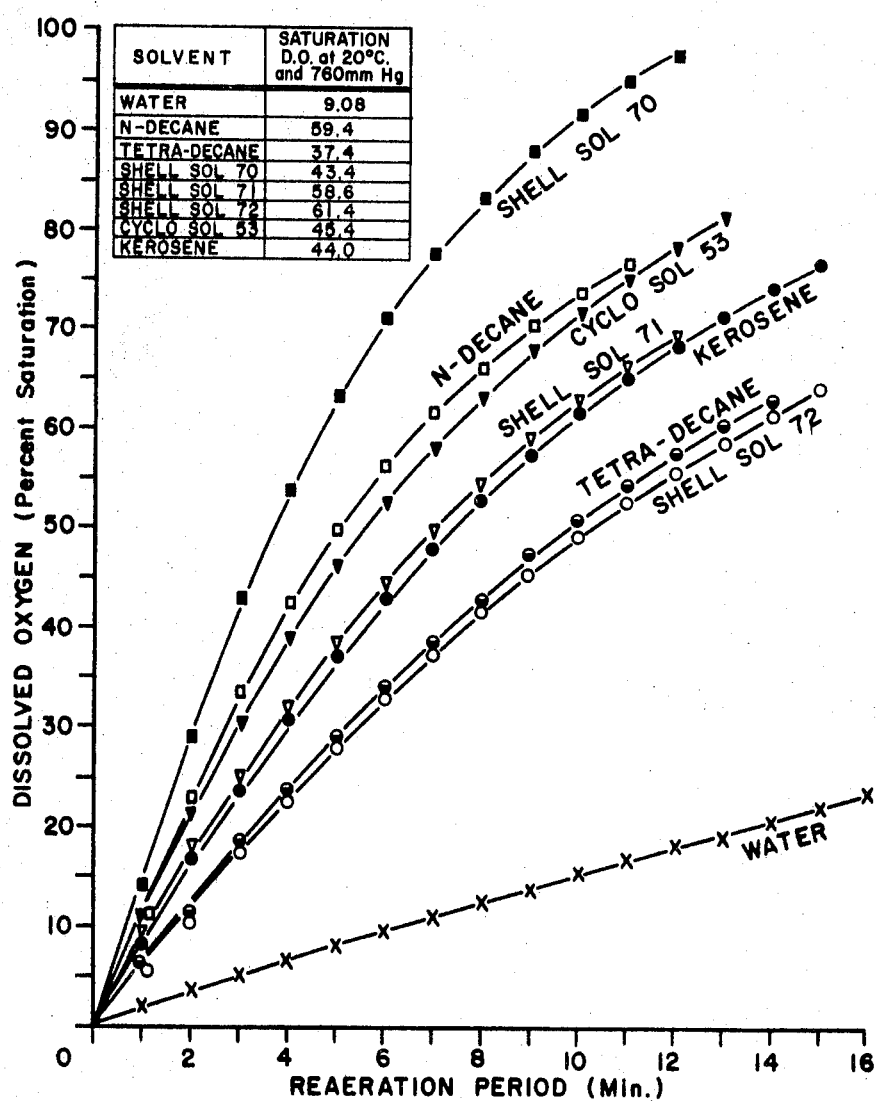
FIG. 1 illustrates the rate at which oxygen dissolves in various solvents.

Ample evidence has existed in the literature for a number of years, documenting this difference in solubilities. The difference in the rate at which oxygen dissolves in various solvents, under identical conditions, is illustrated in FIG. 1. In this experiment, 500 ml. of the solvent, held at 20±1° C., were stirred at a constant rate (to produce no vortex), and the dissolved oxygen content was measured at increasing time intervals, at 4 cm. from the surface. Thus, oxygen dissolution occurred entirely through the surface of the liquid, maintaining a constant interface. Shell Sol (trademark) 70, 71 and 72 are proprietary solvents, commercially available from Shell Development Company, Emeryville, Calif., and are members of their Shell Sol Series, containing principally paraffinic compounds and with boiling ranges between 300° and 400° C. The cyclo Sol (trademark) compounds are also available from the Shell Development Corporation under their Cyclo Sol Series and are principally high boiling point aromatic naphthas. Values in FIG. 1 are expressed as percentages of the oxygen saturation capacity of the individual solvents. These combined data substantiate that oxygen is appreciably more soluble in various petroleum fractions than it is in water and that the rate of oxygen uptake in these fractions is 22 to 38 times greater than that for water for the same energy input or time interval.

An improvement in oxygen take up is evident when as little as 0.3% of the solvent is present in the aqueous phase and the amount of solvent used may be as high as 60% on a v./v. basis.

The process according to the invention is concerned with dissolving oxygen from the atmosphere, an oxygen-containing gas or an oxygen-rich gas into a water-immiscible solvent in which the oxygen solubility is appreciably greater than water. The immiscible solvent may be in contact with or physically separated from water during oxygenation. However, transfer of oxygen from the immiscible liquid to the water is undertaken by dispersing the immiscible liquid phase into the water. Any of the conventional techniques now used for aeration and dispersion of air into a liquid may be used for aeration and dispersion of the immiscible liquid either concurrently or separated physically from the water phase. The principal from the water phase. The principal advantage of this invention is that the oxygenated oil acts as a reservoir of oxygen, which cannot escape as can a gas, and that the combined rate of transfer from the atmosphere to the oil phase and then from the oil phase to the water is faster and is more efficient for certain immiscible liquids than for air to water systems. In terms of the above rate-equation, the present invention is concerned with changing the oxygen deficit ($C_o-C$) or the $K_L$ value or both, rather than merely attempting to modify the interfacial area (A) as do present mechanical techniques.

It is quite difficult experimentally to measure the oxygen mass transfer coefficient ($K_L$) or the interfacial area (A) independently, except for very carefully controlled and selected systems. Therefore, the common techniques in evaluating the overall efficiency of systems for transferring oxygen from the gaseous to the dissolved state involves measurements of the product $K_L.A$. Methods for measuring the overall efficiencies of oxygen transfer systems include sulfite oxidation and the "unsteady state gassing-out" technique. In the presence of a suitable catalyst, sulfite is oxidized so rapidly by dissolved oxygen that the oxygen concentration in solution is always zero. Thus, in the above equation, where C is O and $C_o$ is a constant, $R \alpha K_L.A$ and the amount of sulfite oxidized per unit of time, is a measure of $K_L.A$. Another technique involves the instantaneous measurement of dissolved oxygen levels by polarographic techniques. By suitable integration of the rate equation, $K_L.A$ values for air-water-oil systems over those for air-water systems are illustrative of the advantages of this invention. When 1.0 normal sodium sulfite solutions were shaken for 2 hours in the presence of a copper catalyst, with the addition of 37.5% of immiscible solvent (for 2 of 3 solvents), as shown in Table 2, the relative oxygen uptake expressed as 100% for the aqueous solution alone, was as high as 136% for the water-kerosene system.

TABLE 2

Uptake of oxygen by catalyzed sodium sulfite solutions after two hours' shaking

| Solvent system: | Oxygen uptake, percent |
|---|---|
| Water (0.1 N Na$_2$SO$_3$) | 100 |
| Water+kerosene | 136 |
| Water+cyclohexane | 110 |
| Water+n-octane* | 104 |

*Relative volumes of kerosene and cyclohexane were 37.5% of the water phase; n-octane was 11.0%.

The improvement in oxygen transfer is illustrated further for sulfite aqueous systems to which have been added different levels of kerosene, as shown in Table 3.

TABLE 3.—UPTAKE OF OXYGEN BY CATALYZED SODIUM SULFITE SOLUTIONS WITH INCREASING AMOUNTS OF KEROSENE, AS MEASURED IN SHAKE FLASK SYSTEMS AND IN WARBURG RESPIROMETER FLASKS

| Percent kerosene, v./v. | Oxygen uptake | |
|---|---|---|
| | Shake flasks,[1] percent | Warburg Respirometer, μl./min. |
| 0 | 100 | 37.3 |
| 2 | 102 | |
| 3 | | 43.7 |
| 6 | | 73.2 |
| 10 | 110 | |
| 20 | 120 | |
| 60 | 160 | |

[1] After two hours.

Data presented in Table 3 were obtained using two individual procedures for incorporating oxygen into the sulfite solutions. In shake flasks, 60% of kerosene added to the sulfite solution, on a volume to volume basis, increased the uptake of oxygen by 60%. In the Warburg Respirometer, 6% addition almost double the rate. The Warburg Respirometer is particularly simple to use under the nitrogen atmospheres which are necessary experimentally for deriving oxygen transfer data. The uptake in shake flasks was measured chemically by the amount of sulfite oxidation, whereas in the Warburg Respirometer the oxygen uptake was taken as the difference in gas volumes above the sulfite solutions, as measured manometrically. These data in Table 3 illustrate the improvement in rate of oxygen uptake in the presence of kerosense. However, while no data are presently available to indicate any empirical basis for selecting the most effective immiscible liquid for oxygen transfer, data in FIG. 1 show that hydrocarbons other than kerosense are also highly effective and taken together with data in Table 1, disclose that paraffinic compounds, particularly branched paraffins, and aromatic naphthas, both of an intermediate boiling range, are effective.

Where are immiscible liquid has the property of facilitating oxygen transfer from the gaseous to the dissolved state, then, to be of use in microbiological systems, the liquid must not be consumed in appreciable quantities by the microorganisms, nor must it suppress their activities unduly. The literature suggests that many of the immiscible liquids with high oxygen solubilities, such as the various petroleum fractions, are not inimical to microorganisms. Indeed, a major problem in the storage of petroleum products is the wide range of microflora which grow at the oil-water interface formed when atmospheric water vapor has condensed inside petroleum storage tanks. Data in Table 4 illustrate that kerosense does not inhibit activated sludge bacteria and at the same time facilitates oxygen transfer into microbiological systems.

TABLE 4.—UPTAKE OF OXYGEN BY A MIXED "ACTIVATED SLUDGE" FLORA IN VARIOUS ENERGY SUBSTRATES AND MEDIA CONDITIONS, IN THE PRESENCE AND ABSENCE OF 3½% KEROSENE (v./v.)

| Energy substrate | Media conditions | Maximum oxygen uptake, µl./min. | |
|---|---|---|---|
| | | Water | Water plus kerosene |
| Glucose | Distilled water | 0.08 | 2.08 |
| Sodium acetate | Complete mineral medium | 2.0 | 4.0 |
| Do | Saline solution | 0.14 | 0.12 |
| Do | Saline solution, phosphate buffered | 0.43 | 9.57 |

In securing the data in Table 4, high levels of inocula and substrates were used in an endeavor to make oxygen transfer the limiting factor. In all instances, appreciable oxygen uptake was obtained in the water-kerosene systems. In the only instance where oxygen uptake was less in the water-kerosene than in the water system, i.e., a sodium acetate substrate in a saline solution medium, the situation was reversed when the system was buffered with phosphate. These data illustrate that oxygen uptake is improved by the technique of this invention in biological systems and that certain immiscible liquids do not inhibit microbiological activity when used in this manner.

During our investigations, over a period of several months we operated a bench-scale activated sludge system, utilizing a synthetic waste in the presence of excess kerosene. Aeration procedures involved conventional sparging with laboratory compressed air. Continued growth has shown quite conclusively that the petroleum fractions contained in the kerosene definitely are not inhibitory to microbiological activity. In addition, appreciable amounts of the kerosene were not consumed by the bacteria as long as more readily assimilable substrates were available.

Figure 2:
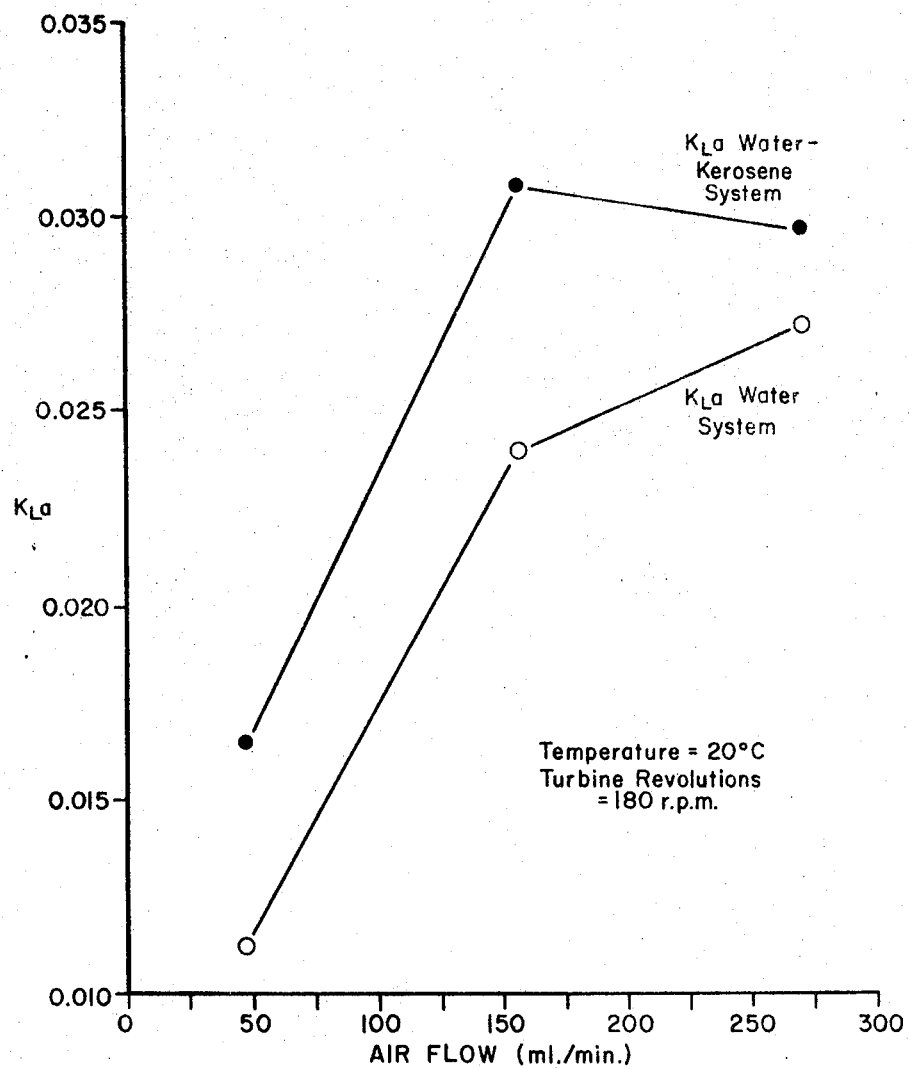
FIG. 2 illustrates the effect of air flow on oxygen transfer rate.
Figure 3:
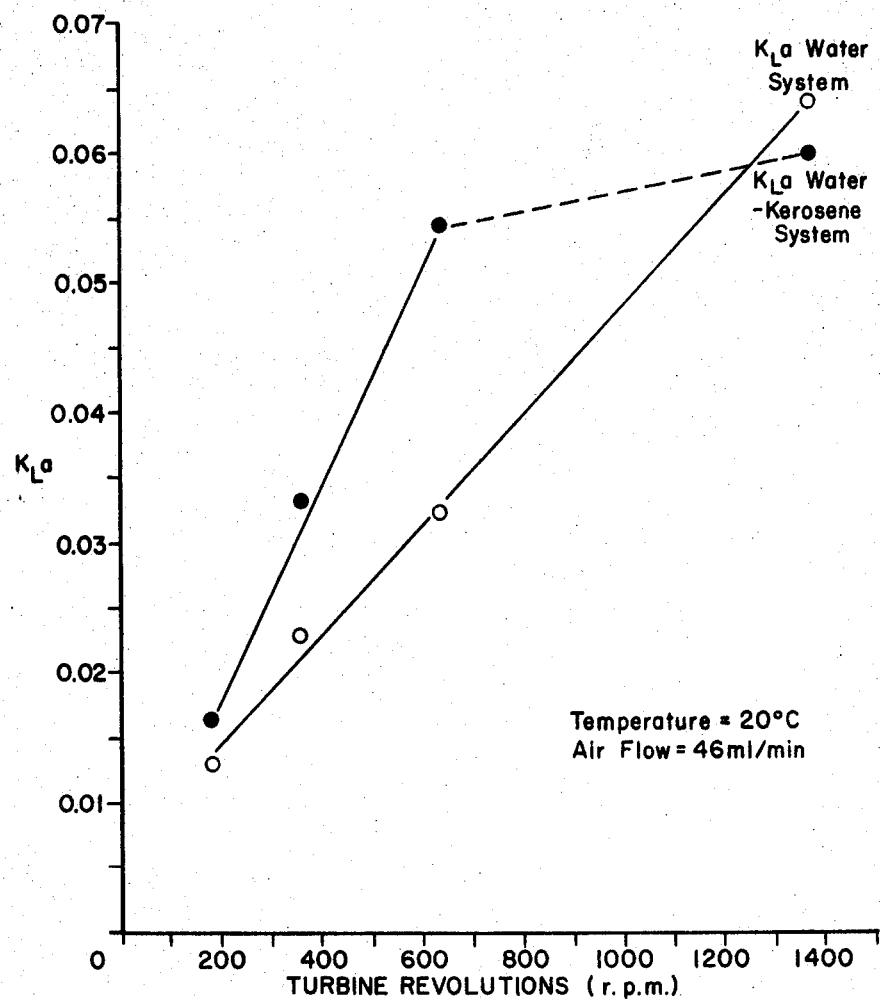
FIG. 3 illustrates the effect of turbine revolutions on oxygen transfer rate.

A common laboratory technique for measuring the rate of oxygen transfer and evaluating system additives and process modifications involves a conventional air sparger-turbine system. This simulates certain commercial-scale equipment, with a paddle turbine mounted directly over air sparger in a baffled vessel, with a limited range of vessel diameter to height. By starting with deoxygenated water, from which the oxygen has been removed by stripping with nitrogen, the oxygen uptake rate is determined polarographically, and the $K_L.A$ for the system is determined by integration or graphical techniques. We have used equipment of this nature to measure comparative $K_L.A$ values in oil-water systems containing 100 ml. of kerosene and 28 liters of water. The improvement in $K_L.A$ values for increasing air flows and turbine revolutions are shown in FIGS. 2 and 3, respectively. Despite the limited volume of kerosene in relation to the total water volume of the system, the improvement obtained by this invention is evident at lower air flows and turbine revolutions. Both at high air flows and high turbine speeds the apparent decrease in $K_L.A$ values was accompanied by emulsification of the oil-water system. We attribute the concurrent apparent drop in $K_L.A$ values to difficulties in polarographic measurement of oxygen levels under emulsification conditions, rather than to an actual drop in the $K_L.A$ figure. Although emulsification which might occur in certain microbiological systems may not be economically damaging, it undoubtedly would be where large volumes of water must be handled inexpensively, as in sewage treatment plants. In sewage treatment procedures, volumes of water are large, concentrations of substrate are generally low and the cost of breaking emulsions may be unattractive economically so that design to minimize emulsion formation is desirable. In more conventional fermentations, this factor is of lesser significance, particularly compared to the gain attendant upon increased oxygen transfer.

Figure 4:
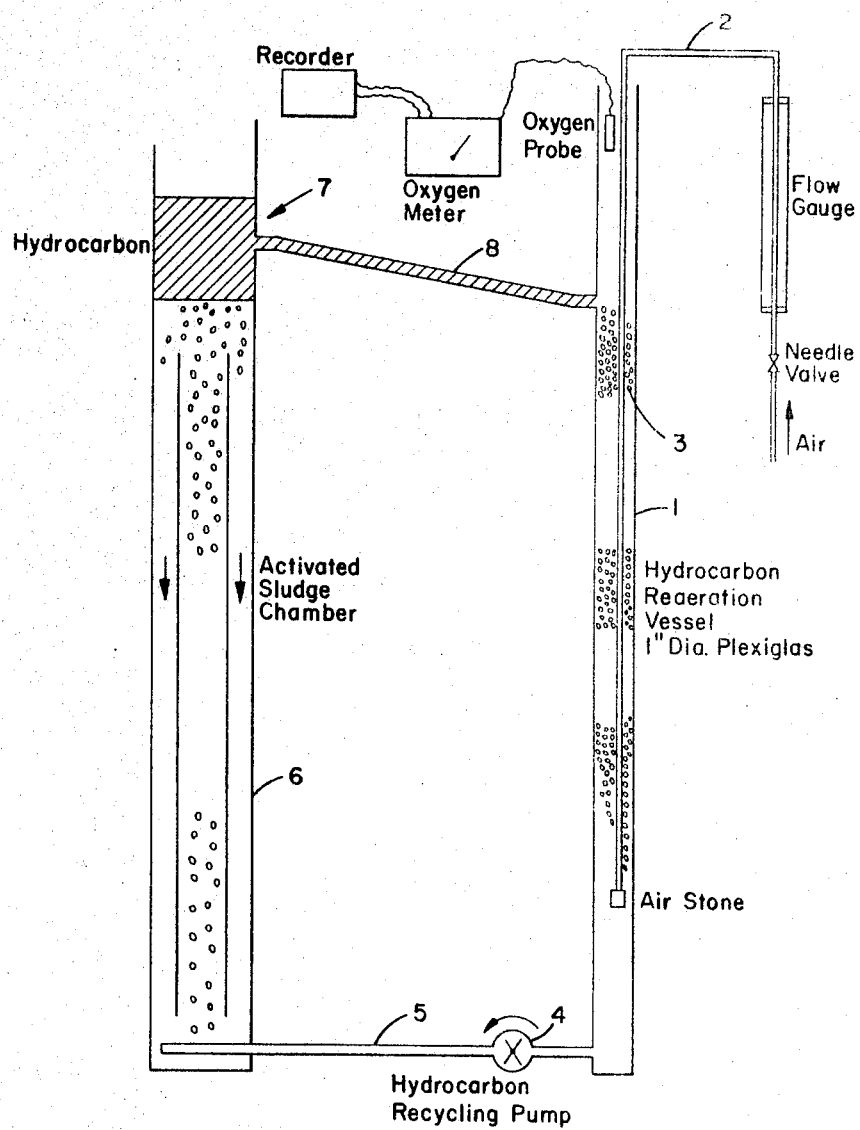
FIG. 4 is diagrammatic illustration of a hydrocarbon-aqueous activated sludge system.

A useful procedure for employing the technique of this invention and avoiding or minimizing emulsification which occurs in certain situations, is illustrated in FIG. 4.

A suitable water-immiscible solvent is oxygenated (or reoxygenated) in a vessel or column 1 by means of air delivered through line 2. A recycling pump 4 delivers oxygenated solvent from the bottom of column 1 via line 5 to an activated sludge chamber or fermentation chamber 6. Due to the differences between the specific gravity of the solvent and the aqueous liquid in the chamber 6 the solvent rises, for example through a perforated plate, in the form of droplets upwardly through the aqueous liquid and releases dissolved oxygen. The solvent gathers at the top of the chamber at 7 and is recycled to the column 1 through line 8. As shown by the legend on the drawing the apparatus may include an oxygen probe, an oxygen meter and a recorder. The chamber 6 will obviously also be adapted for delivery of aqueous influent and removal of aqueous effluent.

In this technique oxygenation of the immiscible liquid or oil is separated physically from the fermentation medium. Then the oxygenated oil is dispersed throughout the aqueous medium without it having any direct contact with the oxygen source, i.e., the atmosphere or bulk oxygen. We operated such a system for seevral months employing 5.2 liter of a synthetic medium with a BOD$_5$ (biochemical oxygen demand over a five-day period) of about 300 mg./l., a 1.0-liter inoculum of an activated sludge flora containing about 3000 mg./l. of mixed liquor volatile suspended solids, and 1.3 liters of kerosene. The system was operated on a "fill and draw" basis by removing 2 liters of the aqueous media per day and replacing with fresh substrate, though such a system may be operated continuously. Average air flows were in the range 22 to 155 ml./min. and oxygenated oil was recycled at a rate of 300 ml./min. The typical data in Table 5 illustrate that with this technique a satisfactory level of bacterial activity can be maintained.

TABLE 5.—OPERATING DATA FOR A FERMENTATION SYSTEM IN WHICH OXYGEN IS SUPPLIED BY DISPERSING OXYGENATED KEROSENE THROUGH THE AQUEOUS MEDIUM

| Day | Oil aeration rate, ml./min. | Oxygen utilized in Air entering oil, percent | BOD$_5$, mg./l. Feed | BOD$_5$, mg./l. Filtered effluent | Mixed liquor volatile suspended solids, mg./l. |
|---|---|---|---|---|---|
| 1 | 36 | | 300 | | 650 |
| 2 | 36 | | 300 | | |
| 9 | 36 | | 300 | 1 | |
| 11 | 22 | 30 | 300 | 12 | |
| 13 | 22 | | 560 | 13 | |
| 14 | 22 | | 560 | | 940 |
| 15 | 80 | | 560 | | |
| 16 | 22 | | 560 | 23 | |
| 17 | 22 | 54 | 560 | 29 | 1,620 |
| 18 | 80 | | 560 | 57 | |

Operating difficulties experienced with the laboratory model on a fill and draw basis are overcome with continuous operation. Despite the fluctuation in operation of the laboratory model, the data indicate that with a feed of 300 mg./l. BOD$_5$, removal can be as high as 98%. Efficiency of utilization of oxygen in the air used to aerate the kerosene was as high as 54%. This is extremely high compared to present commercial techniques. The increase in mixed liquor volatile suspended solids indicated that the fermentation was accruing the necessary sludge levels for rapid fermentation rates. At the same time, microscopic examination of sludge indicated a normal activated sludge fluora. An additional advantage of the technique illustrated in FIG. 4 is that where the dispersed oxygenated immiscible liquid is allowed to rise by gravity through the fermentation medium, which will occur where the specific gravities permit, the circulation provided in this manner is sufficient to keep the floc dispersed, without any additional agitation. The data in Table 5 and the illustration in FIG. 4 are examples only, indicating the technical feasibility of operating a fermentation and providing the oxygen necessary for growth and respiration solely from the dispersion of oxygenated oil through the fermentation medium. Any conventional techniques for undertaking the component operations may be applied. For example, it is recognized that air sparging may not be the most efficient procedure for oxygenating the liquid, prior to dispersing it through the aqueous medium. Any commerical aeration device may be used for this purpose as may any distribution device for dispersing the immiscible liquid through the water phase.

The economical advantages of such a system on a commerical scale will depend upon the amount and efficiency of oxygen transfer from the oxygenated liquid into the water phase. These transfer rates depend upon contact height, liquid droplet size and oxygen content of the liquid. with the technique of this invention, it is not essential that the liquid be aerated to saturation, nor that transfer of oxygen from the liquid to the water phase proceed to equilibrium. Since the oxygen is dissolved in the liquid and cannot escape as can air in a gaseous-liquid system, an optimum combination of liquid aeration procedure and oxyegn transfer from liquid to water phase can be used. Conditions can be adjusted so that only that portion of the oxygen dissolved in the liquid which is most efficiently transferred is utilized. For example, if the maximum solubility of oxygen in the immiscible solvent or oil is 55 mg./l., then aeration might increase the oxygen level only to 45 mg./l., since the oxygen incorporated into the solvent per unit of energy decreases approximately logarithmically above this value. Correspondingly, when solvent oxygenated to 45 mg./l. is passed through the aqueous medium, then the equipment might be constructed so that only 35 mg./l. of oxygen is transferred. Thus, solvent leaving the top of the contact or fermentation chamber would still contain 10 mg./l. of oxygen. Again, the transfer of this remaining oxygen decreases logarithmically with increasing contact time, rendering further transfer uneconomic. In general only up to about 70% of the theoretically available oxygen may be efficiently transferred. Calculations indicate that transfer of 35 mg. of oxygen per liter of solvent, during a 15-foot height of solvent-water contact, are necessary for this technique to compete with other commercial techniques, such as surface aerators and cage rotors. Our own studies and measurements indicate that this amount of transfer from kerosene to water can be accomplished in certain systems in a contact height of slightly over 3 feet. The design for a commercial system may embrace many conventional techniques in applying the procedure of this invention.

The most desirable instantaneous oil to water ratio is dependent upon a number of factors, but for economic reasons probably would be kept at the minimum necessary to ensure adaequate functioning of this invention. These factors include the total oxygen demand of the waste or system being treated, the desired retention time of the waste in the fermenter (i.e., plant size), the rate and amount of oxygen transfer from the oil to water and the rate at which the oil passes through the water; this latter factor in turn being dependent upon differences in specific gravity between the oil and the aqueous phases and on the bubble size of the oil droplets. Some appreciation of these factors can be achieved by the following example.

For an effluent having a total oxygen loading $(1.5 \times BOD_5)$ of 450 p.p.m., the retention time in an activated sludge system might be 3 to 8 hours, although longer retentions are feasible with other types of systems. In passing through a 10-15-ft. water column, oxygenated oil may be expected to transfer 35 p.p.m. oxygen per volume of oil into the water, during the 20- 30-second contact time. If 450 p.p.m. of oxygen are required, then during the total retention period the volume of oil contacting the effluent is 450/35, or 12.85 times the volume of the effluent. For 3-hour effluent retention, the number of feasible oil passes are $$3 \times 60 \times \frac{60}{30}$$

or 360. Thus the volume of oil in contact with the aqueous phase, at any one time, is $$\frac{12.84}{360} \times 100$$

or 3.5% of the aqueous phase volume. For an 8-hour retention, the corresponding value is 1.35%. Thus, it becomes evident that in most situations, the amount of oil involved in the transfer of oxygen is minimal. The absolute volume of oil will depend largely on the amount necessary to facilitate oxygen transfer into the oil, and to maintain a reservoir which ensures a continuous supply of oxygenated oil into the fermenting chamber. Both factors depend on the actual physical amounts of the effluent to be treated, and are not based on the concepts of this invention.

Certain chemical systems exist where oxygen is the oxidizing agent and where transfer of oxygen from the gaseous to the dissolved state is the rate-limiting step. This invention is also useful in such commercial applications. A typical illustration is the treatment of waste caustic scrubbing liquors used for the removal of mercaptans from petroleum, prior to re-use or prior to further processing for the recovery of cresylic acids. During this process, the sodium mercaptides are oxidized to the corresponding disulfide oils as represented by the following equation:

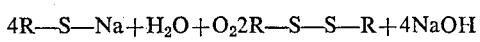

$$4R\text{—}S\text{—}Na + H_2O + O_2 \rightarrow 2R\text{—}S\text{—}S\text{—}R + 4NaOH$$

The disulfide oils formed are insoluble and may be removed by decantation. The regenerated caustic then may be re-used for additional scrubbing of mercaptan-containing oils or the caustic solution may be processed for recovery of the sodium cresylates. The rate at which the oxidation of mercaptides proceeds is proportional to the dissolved oxygen concentration. As in microbiological fermentations, the dissolved oxygen is limited to the 8 p.p.m. normally soluble in aqueous solutions. In commercial procedures the reaeration of these solutions is an essential part of these processes. Thus, oxygen may be transferred into this type of system through the technique of our invention. The disulfide oils themselves, being highly immiscible with water, might be used for oxygen transfer if oxygen is sufficiently soluble and if the rate of oxygenation is sufficiently high. Otherwise, a suitable immiscible liquid, such as kerosene or some of the proprietary solvents mentioned previously could be used and could be recovered from the disulfide oils by distillation. This distillation technique would regenerate small amounts of mercaptans which would pass over into the kerosene or proprietary solvent. However, this would be of little consequence, since these mercaptans would be converted immediately to the sodium mercaptide when the oxygenated immiscible liquid was contacted with the waste caustic scrubbing solution. Other examples of chemical oxygenations or oxidations in aqueous systems where the invention is applicable will be readily apparent to those skilled in the art.

What is claimed is:

1. A method of increasing the rate and efficiency of oxygen transfer into aqueous solutions comprising:
   (i) selecting a water-immiscible liquid which (a) has a greater solubility for oxygen than has water, or (b) for an equivalent amount of energy, allows a faster transfer of oxygen into the liquid, than is transferred into water under similar conditions or (c) both;
   (ii) oxygenating the liquid;
   (iii) contacting the water-immiscible liquid with the aqueous solution whereby oxygen is transferred from the water-immiscible liquid to the aqueous solution, said aqueous solution being a microbiological system which contains carbohydrate substrates preferentially metabolized by the microorganisms;
   (iv) separating the water-immiscible liquid from the aqueous solution;
   (v) re-oxygenating said liquid,
   (vi) returning the re-oxygenated water-immiscible liquid to said aqueous liquid, and
   (vii) contacting the water-immiscible liquid with the aqueous solution as in step (iii).

2. The method according to claim 1 wherein, during oxygenation, the liquid and the solution are in physical contact.

3. The method of increasing the rate and efficiency of oxygen transfer to aqueous solutions which comprises:
   (a) dissolving oxygen in a water-immiscible liquid, the saturation solubility of which, in terms of oxygen, exceeds that of water,
   (b) contacting the oxygenated liquid throughout the aqueous solution in order to transfer oxygen from the liquid to the solution, said aqueous solution being a chemical system utilizing molecular oxygen,
   (c) reoxygenating the liquid, and
   (d) re-using the thus oxygenated liquid in step (b).

4. The method according to claim 3 wherein, during oxygenation, the liquid and the solution are in physical contact.

5. The invention according to claim 3 wherein the aqueous solution is a waste scrubbing liquor.

6. The invention according to claim 1 wherein the water-immiscible liquid is selected from the group consisting of paraffinic naphthas and aromatic naphthas.

7. The invention according to claim 1 where the water-immiscible liquid is selected from the group consisting of pyridine, benzene, toluene, xylene, petroleum ether, benzine (B.P. 65–100° C.), paraffin oil, transformer oil, and liquid petroleum.

8. The invention according to claim 7 wherein the liquid petroleum is kerosene.

9. The method according to claim 1 where the specific gravity of the water-immiscible liquid is less than that of water and where the liquid is dispersed upwardly through the aqueous solution in the form of droplets.

10. The method according to claim 1, the oxygen-solubility of the liquid being at least five times greater than that of water.

11. The method according to claim 5 where the water-immiscible liquid is kerosene.

12. The method according to claim 1 wherein the selected water-immiscible liquid exhibits an oxygenation rate at least 22 times greater than that for water.

13. The method according to claim 1, the liquid being oxygenated with air or an oxygen-rich gas.

14. The method according to claim 1, wherein up to about 70% of the available oxygen is transferred.

15. The invention according to claim 1 wherein two or more solvents are combined to form the immiscible liquid.

16. The invention according to claim 1 wherein the amount of immiscible liquid used is up to about 50% by volume of the total immiscible liquid/aqueous solution mixture.

References Cited

UNITED STATES PATENTS

| | | | |
|---|---|---|---|
| 3,152,983 | 10/1964 | Davis et al. | 195—3 H |
| 3,326,770 | 6/1967 | Coty | 195—3 H |
| 3,268,413 | 8/1966 | Laine et al. | 195—3 H |
| 3,128,236 | 4/1964 | Zajic | 195—28 R |
| 3,406,095 | 10/1968 | Otsoka et al. | 195—28 R |

A. LOUIS MONACELL, Primary Examiner

M. D. HENSLEY, Asisstant Examiner

U.S. Cl. X.R.

210—15